United States Patent [19]
Lauro

[11] 3,974,022
[45] Aug. 10, 1976

[54] DEVICE FOR MOUNTING PLASTIC NON-RIGID TUBES IN EVAPORATORS

[75] Inventor: Fernand Lauro, Fontaine, France

[73] Assignee: Commissariat a l'Energie Atomique, Paris, France

[22] Filed: Aug. 27, 1974

[21] Appl. No.: 501,092

[30] Foreign Application Priority Data
Sept. 7, 1973 France .............................. 73.32372

[52] U.S. Cl. ............................ 159/13 B; 159/28 R;
159/26 A; 165/81; 165/178
[51] Int. Cl.² ...................... B01D 1/22; B01D 1/00;
F28F 7/00; F28F 9/04
[58] Field of Search .............. 159/13 A, 13 B, 28 R,
159/26 A; 165/81, 82, 178; 29/157.4

[56] References Cited
UNITED STATES PATENTS

| | | | |
|---|---|---|---|
| 1,890,186 | 12/1932 | Lucke | 165/82 |
| 1,987,372 | 1/1935 | Schellhammer | 165/81 X |
| 2,447,259 | 8/1948 | Lucke | 165/178 |
| 2,859,948 | 11/1958 | Callard | 165/82 |
| 3,227,630 | 1/1966 | Beckman | 159/13 B |

FOREIGN PATENTS OR APPLICATIONS
549,431  11/1942  United Kingdom

*Primary Examiner*—Jack Sofer
*Attorney, Agent, or Firm*—Cameron, Kerkam, Sutton, Stowell & Stowell

[57] ABSTRACT

In evaporators for distillation or concentration of solutions, each tube nest consists of non-rigid plastic tubes through which vapor is circulated. Each tube is secured to the fixed structure of the evaporator at the vapor admission end of the tube by means of a standard fastening member and at the vapor discharge end by means of a sliding tubular expansion joint of small cross-sectional area compared with that of the tube.

5 Claims, 4 Drawing Figures

DEVICE FOR MOUNTING PLASTIC NON-RIGID TUBES IN EVAPORATORS

This invention relates to the construction of evaporator tube nests in installations for distillation or concentration of a solution in accordance with the cocurrent or countercurrent multiple-effect cycle. Consideration is given in particular to evaporators which are fitted with flexible plastic tubes arranged vertically such as the falling film type, for example, or horizontal tubes of the spray-film type, for example.

In evaporators of this type, the pressure differences which exist between the condensation side and the vaporization side are very small, thereby permitting the use of heat-transfer surfaces consisting of plastic tubes having very thin walls. Condensation takes place within the interior of the tubes and the cylindrical shape of these latter is maintained automatically.

One of the great difficulties involved in the use of these plastic tubes lies in the fact that this material expands to a much greater extent than other materials (such as steel or concrete) which form the structure of evaporators.

One known method which is commonly employed in metallic heat exchangers to compensate for the longitudinal expansions of the tubes is the so-called "floating head" method which consists in rigidly fixing the tubes at one end to a fixed end plate and at the other end to a free plate which is capable of moving with respect to the evaporator structure. This method which is commonly employed in vertical evaporators entails the need for a complex assembly of tubes which can be contemplated only in the case of plastic tubes by reason of their lack of rigidity, their substantial elongation under the action of heat and of stresses which are not uniform as a result of variation in the thickness of such tubes. The tube nest as a whole would therefore lack rigidity and it would prove difficult to carry out unitary replacement.

In evaporators consisting of horizontal long tubes, deformations of the tubes are even more marked, especially under the action of their own weight, which rules out a priori the use of thin-walled plastic tubes.

The aim of this invention is to overcome the above-mentioned disadvantages in the construction of tube nests in evaporators of the vertical and horizontal long-tube type and more particularly to cause said tubes to be straightened when they are subjected internally to the pressure of a fluid.

To this end, the invention proposes a device for mounting plastic tubes within the fixed structure of a distillation plant with evaporators of the vertical or horizontal tube-nest type, said device being characterized in that each nest consists of non-rigid tubes which are traversed by vapor and each secured at one end to said structure by means of a standard fastening member, the other end of each tube through which the vapor is discharged being secured to said structure by means of a sliding expansion joint of small cross-sectional area compared with that of the tube.

By virtue of this important characteristic feature of the invention, namely the reduction in diameter of the tube at the level of the expansion joint, there is obtained under the action of the pressure of the internal fluid an "end effect" (or piston effect) which applies high longitudinal tensile stress to the tube and thus increases its rigidity to a considerable extent.

In one advantageous embodiment of the invention, the end effect is enhanced by means of an overflow which is located at the end remote from the small-diameter portion of the bushing and forms an axial extension within the interior of each tube. Within the low-pressure stages of the installation, the weight of water which has accumulated within the overflow is added to the tension applied to the extremity of the tube by the differences in pressure.

In another embodiment, the tubes of the horizontal nest are slightly inclined from the standard fastening member and above the horizontal, the aforesaid expansion joint which is mounted at the other end of each tube being such as to comprise a reduction bushing in concentric relation to the axis of each tube aforesaid and engaged with slight friction within a corresponding bore of the structure so as to ensure that the condensate derived from the vapor is discharged on the same side as said fastening member.

In yet another embodiment, the tubes of the horizontal nest are slightly inclined from the fastening member and below the horizontal, said expansion joint which is mounted at the other end of each tube being such as to comprise a reduction bushing which is displaced off-center with respect to the axis of each tube aforesaid and engaged with slight friction within a corresponding bore of the structure so as to ensure that the condensate derived from the vapor is discharged on the same side as said bushing.

The following description relates to exemplified embodiments which are given without any limitation being implied, reference being made to the accompanying drawings, in which.

Figure 1:
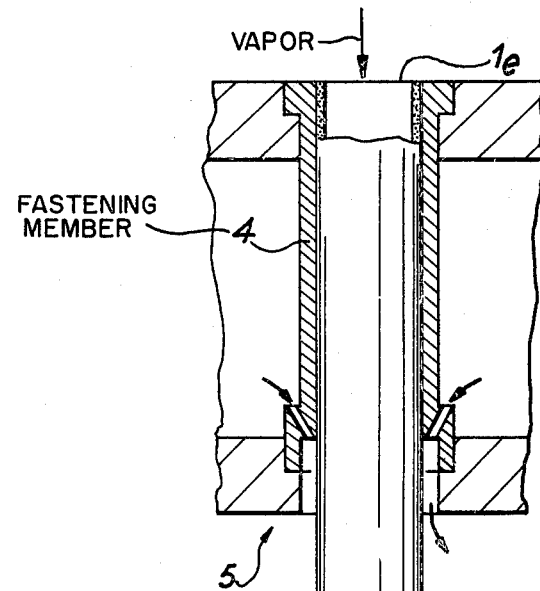
FIG. 1 is an embodiment of the device in accordance with the invention.
Figure 1:
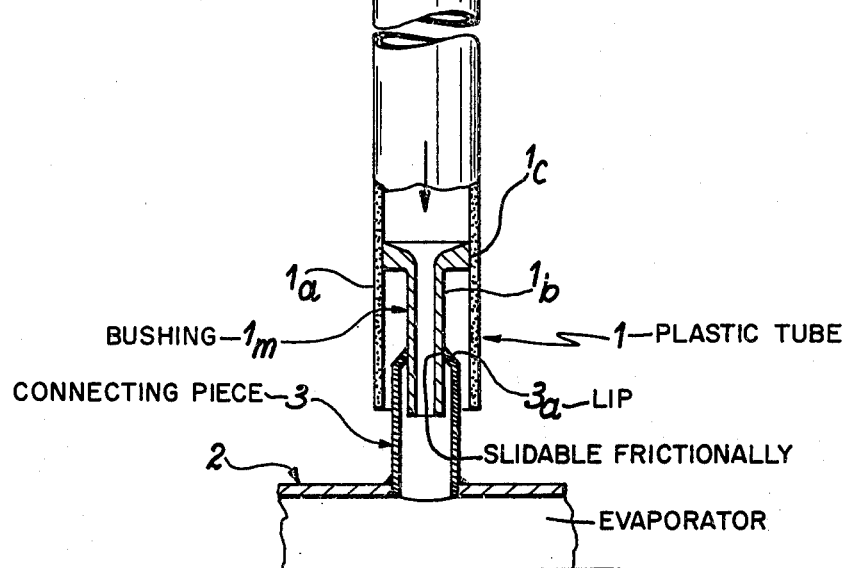

In FIG. 1, the reference numeral 1 designates a plastic tube forming part of a vertical nest which is not illustrated in its entirety.

The lower end $1a$ of the tube is connected by means of a bushing $1m$ having a portion $1b$ of reduced diameter and a connecting-piece 3 to a structural element 2 of an evaporator. The other end $1e$ of the tube is mounted in a conventional manner on another fixed element 5 of the structure by means of a fastening member 4.

The lower end $1a$ of the tube is mounted externally and partially astride of as well as spaced from the connecting-piece 3 which is integral the structural element 2 whilst the small-diameter portion $1b$ of the bushing $1m$ which is tightly secured or affixed to the tube 1 is slidably mounted with slight friction within a circular lip $3a$ of the connecting-piece 3.

There is thus obtained an overlapping expansion joint which is intended on the one hand to prevent any streaming along the connecting-piece 3 and permits on the other hand either elongation or shrinkage of each tube 1 while practically preventing leakages of vapor owing to the presence of the lip $3a$.

The unitary replacement of the tubes such as the tube 1 (shown in FIG. 1) is greatly facilitated since it is only necessary to disengage the small-diameter portion $1b$ of the lip $3a$.

Moreover, the junction surface 1c which joins the internal diameter of the tube 1 to that of the portion 1b of reduced diameter forms the face of a piston, the design function of which will be explained in greater detail hereinafter.

Without departing from the scope of the invention, the embodiment shown in FIG. 1 could be applied to the construction of horizontal tube nests.

Figure 2:
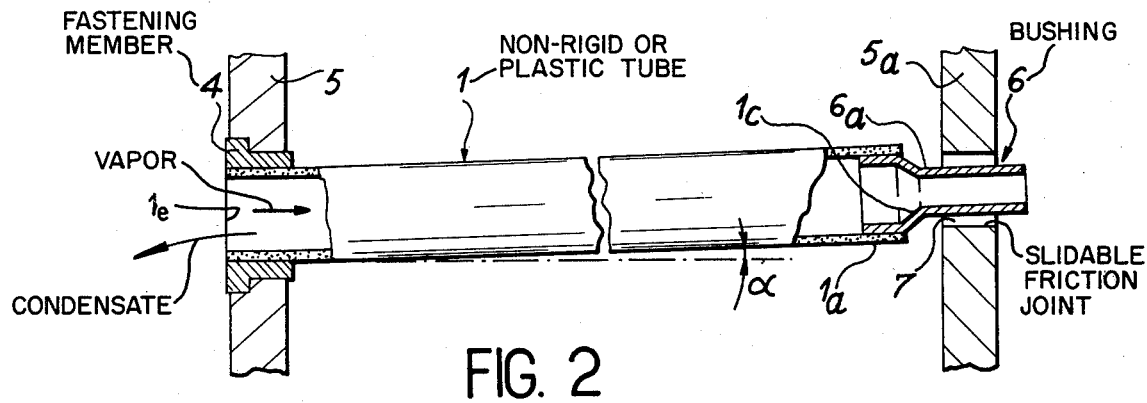
FIG. 2 is another embodiment of the device in accordance with the invention.

FIG. 2 illustrates a plastic tube forming part of a horizontal nest which is not illustrated in its entirety. The tube 1 is secured at one end by means of a fastening member 4 to a structural element 5 which can be a partition of the evaporator or a collecting element. The other end 1a of the tube 1 terminates in a bushing 6 which is concentric with the axis of the tube 1 and provided with a portion 6a of reduced diameter which is slidably mounted with slight friction within a bore 7 of another element 5a of the structure. The bushing 6 and the bore 7 form an expansion joint which is slidably mounted within the structure 5a.

The tubes mounted in accordance with the embodiment shown in FIG. 2 are set by design at an angle $\alpha$ with respect to the horizontal so as to slope downwards in the direction of the extremity 1e.

The junction surface 1c which joins the internal diameter of the tube 1 to that of the small-diameter portion 6a forms the face of a piston, the design function of which will be explained in greater detail hereinafter as in the case of FIG. 1.

Figure 3:
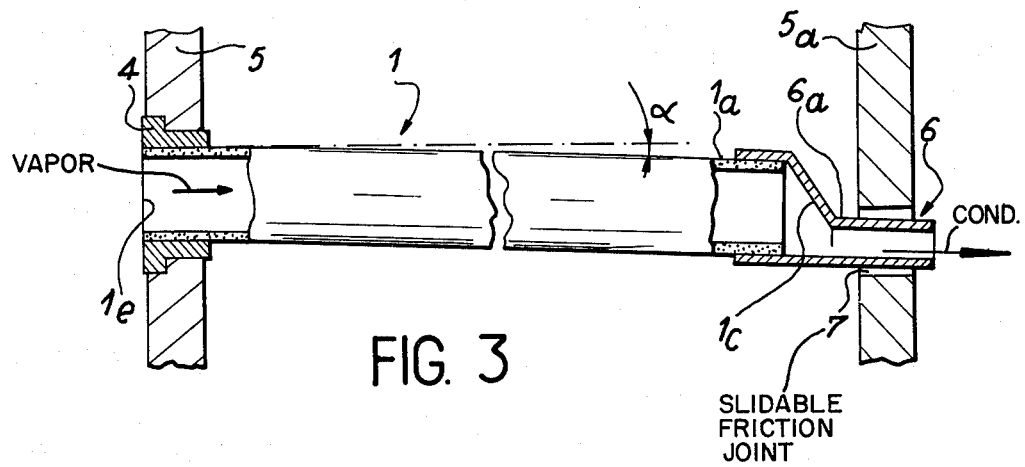
FIG. 3 is an alternative form of the embodiment shown in FIG. 2.

FIG. 3 illustrates an embodiment which is similar to that of FIG. 2. In this example, however, the bushing 6 has a small-diameter portion 6a which is displaced offcenter in the downward direction with respect to the axis of the tube 1.

The tubes mounted in accordance with the embodiment of FIG. 3 are also set by design at an angle $\alpha$ with respect to the horizontal so as to slope downwards in the direction of the extremity of the small-diameter portion 6a.

The junction surface 1c has the same function as in the other two examples described in the foregoing.

Without departing from the scope of the invention, the embodiments of FIGS. 2 and 3 could be applied to the construction of vertical-tube nests, especially of the type which employs a falling film either outside the tubes.

Figure 4:
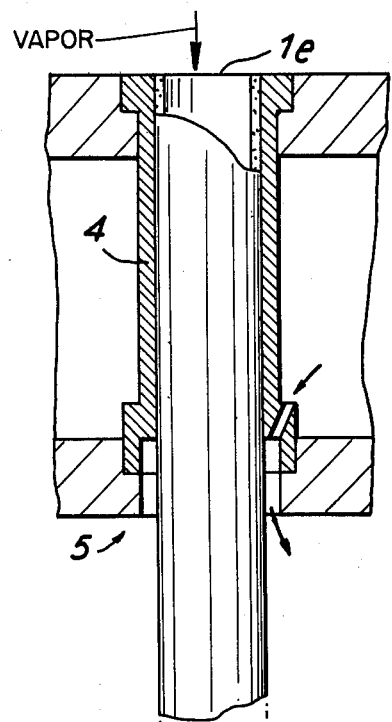
FIG. 4 is an alternative form of the embodiment shown in FIG. 1.
Figure 4:
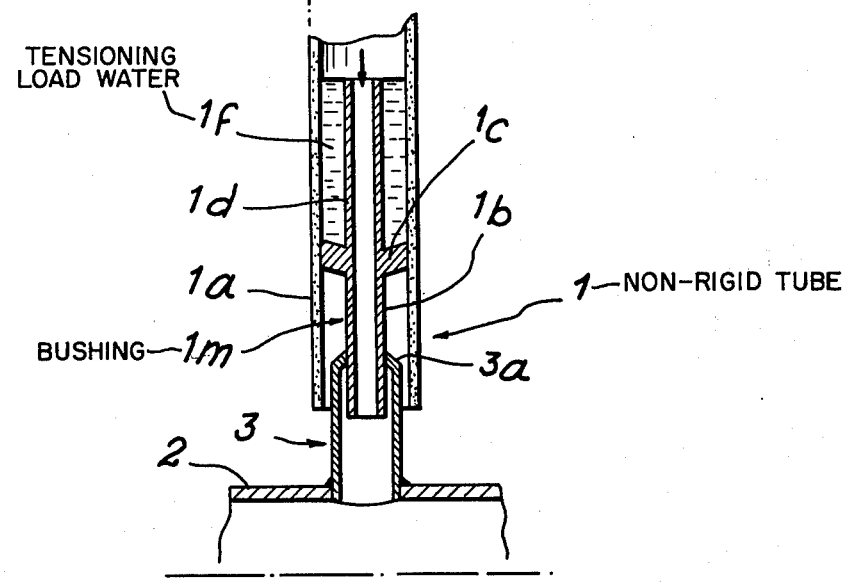

In accordance with the invention and as shown in FIGS. 1 to 4, the tubes such as the tube 1 are provided with a standard fastening member 4 and are free to expand in the longitudinal direction by means of bushings such as those designated by the reference 1m (in FIGS. 1 and 4) or by the reference 6 (in FIGS. 2 and 3). In the case of FIG. 1, the small-diameter portion 1b is slidably fitted within the joint 3; in FIGS. 2 and 3, the small-diameter portion 6a is capable of sliding within the bore 7. The vapor which is introduced into the tube 1 (in the direction of the arrow) exerts a pressure on the internal junction surface 1c which acts as a piston and straightens the tube by producing a pulling action on this latter (end effect) either in the downward direction (as shown in FIGS. 1 and 4) or horizontally towards the structure (as shown in FIGS. 2 and 3).

If the tubes are inclined at an angle $\alpha$ towards the standard fastening member 4 (between 1e and 5 in FIG. 2), the bushing 6 can be concentric and the condensate is collected in the vicinity of the inlet 1e. If the tubes are inclined towards the vapor outlet, the bushing 6 is necessarily displaced off-center in the downward direction (as shown in FIG. 3) in order to collect the condensate through this outlet.

A negligible leakage of vapor is permitted to remain as a result of the clearance within the bore 7 between the end-plate 5a and the small-diameter portion 6a of the bushing 6, especially when the invention is applied to low-temperature stages or to small-scale plants.

In the low-pressure stages of the installation, compensation for small pressure differences can be achieved advantageously by making provision for an overflow tube 1d (as shown in FIG. 4) which forms an upward extension of the bushing 1m within the interior of the tube 1. The weight of the water 1f which accumulates between the tube 1 and the overflow tube 1d serves to load the tube with a ballast-weight which is added to the tension produced by the difference of pressures to which said tube is subjected.

What we claim is:

1. A device for mounting plastic tubes within the fixed structure of a distillation plant with evaporators of the vertical or horizontal tube-nest type, wherein each nest consists of non-rigid tubes which are internally traversed by vapor and each secured at one end to said structure by means of a standard fastening member, the other end of each tube through which the vapor is discharged being secured to said structure by means of a sliding expansion joint having a through passageway, said joint being secured to and within the tube and said passageway being of small cross-sectional area compared with that of the tube, the pressure of the vapor in the tube causing a tube tensioning piston effect on the expansion joint.

2. A device according to claim 1, wherein the tubes of said horizontal nest are slightly inclined from the standard fastening member and above the horizontal and wherein the aforesaid expansion joint which is mounted at the other end of each tube comprises a reduction bushing in concentric relation to the axis of each tube and engaged with slight friction within a corresponding bore of the structure so as to ensure that the condensate derived from the vapor is discharged on the same side as said fastening member.

3. A device acording to claim 1, wherein the tubes of said horizontal nest are slightly declined from the standard fastening member and below the horizontal, to the aforesaid expansion joint which is mounted at the lower end of each tube comprises an eccentric reduction bushing which is displaced downwardly off-center with respect to the axis of each tube aforesaid and whose reduced end is engaged with slight friction within a corresponding bore of the structure so as to ensure that the condensate derived from the vapor is discharged on the same end as said bushing.

4. A device in accordance with claim 1, wherein the expansion joint of small cross-sectional area comprises a reduction bushing engaged with slight friction within an annular lipped connecting-piece which is rigidly fixed to the structure, the tube extremity of normal cross-sectional area being adapted to overlap said connecting-piece.

5. A device according to claim 2, wherein said tube is vertical and said bushing is located at the lower end of said tube and is provided with an overflow which is located at the end remote from the small-diameter portion thereof and forms an axial extension of the joint within the interior of the tube.

* * * * *